United States Patent
Nambord et al.

(10) Patent No.: US 9,369,184 B2
(45) Date of Patent: Jun. 14, 2016

(54) PHONE COVERS WITH NFC CIRCUIT POWERED DISPLAY DEVICES

(71) Applicant: Sony Corporation, Tokyo (JP)

(72) Inventors: Magnus Nambord, Lund (SE); Emil Hansson, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/401,742

(22) PCT Filed: Feb. 20, 2014

(86) PCT No.: PCT/JP2014/000890
§ 371 (c)(1),
(2) Date: Nov. 17, 2014

(87) PCT Pub. No.: WO2015/114689
PCT Pub. Date: Aug. 6, 2015

(65) Prior Publication Data
US 2015/0288421 A1    Oct. 8, 2015

Related U.S. Application Data

(60) Provisional application No. 61/933,639, filed on Jan. 30, 2014.

(51) Int. Cl.
| H04B 5/00 | (2006.01) |
| H04M 1/04 | (2006.01) |
| H04M 1/725 | (2006.01) |
| H04M 1/11 | (2006.01) |
| G06F 1/16 | (2006.01) |

(52) U.S. Cl.
CPC ............ *H04B 5/0037* (2013.01); *G06F 1/1632* (2013.01); *H04M 1/04* (2013.01); *H04M 1/11* (2013.01); *H04M 1/72575* (2013.01); *H04M 2250/04* (2013.01)

(58) Field of Classification Search
CPC ....................................................... H04B 5/0037
USPC ............................................... 455/41.1–41.3
See application file for complete search history.

(56) References Cited

U.S. PATENT DOCUMENTS

2013/0203347 A1    8/2013    Moosavi
2013/0311372 A1*  11/2013   Ramaci ......................... 705/44

FOREIGN PATENT DOCUMENTS

EP    2 579 122 A1    4/2013

OTHER PUBLICATIONS

International Search Report and Written Opinion of the International Searching Authority, PCT Application No. PCT/JP2014/000890, Sep. 30, 2014.
Written Opinion of the International Preliminary Examining Authority, Application No. PCT/JP2014/000890, Jan. 12, 2016.

* cited by examiner

*Primary Examiner* — Tuan H Nguyen
(74) *Attorney, Agent, or Firm* — Myers Bigel & Sibley, P.A.

(57) ABSTRACT

A cover for a user equipment, such as a cell phone, includes a housing, a display device, and a near field communication (NFC) circuit. The housing is attachable to the user equipment, and while attached covers a back surface of the user equipment. The display device is at least partially disposed within the housing. The NFC circuit that is configured to generate power through inductive coupling to another NFC circuit within the user equipment, the NFC circuit configured to operate using the power to receive data from the other NFC circuit within the user equipment, and to supply the power and the data to the display device to cause the data to be displayed for viewing by a user. Related user equipment, methods, and computer program products are disclosed.

18 Claims, 4 Drawing Sheets

User Equipment Cover
Front View

PHONE COVERS WITH NFC CIRCUIT POWERED DISPLAY DEVICES

CROSS REFERENCE TO RELATED APPLICATIONS

This application is a 35 U.S.C. §371 national stage application of PCT International Application No. PCT/JP 2014/000890, filed on Feb. 20, 2014, which itself claims priority to U.S. Provisional Application No. 61/933,639, filed Jan. 30, 2014, the disclosure and content of both of which are incorporated herein by reference in their entirety as if set forth fully herein.

TECHNICAL FIELD

The present invention relates to wireless communication devices and, more particularly, to mobile phones and related covers that are attachable to mobile phones.

BACKGROUND ART

Cell phone manufacturers desire to produce products that have a unique out-of-box look and feel, and which are capable of substantial personalization however a user may desire. However, this is contrary to the increasing trend in cell phones toward thin rectangular housings that provide little room for aesthetics differentiation. Users are generally limited to selecting covers that are attachable to cell phones to provide personalization. Due to the cost of replacing such covers, users rarely change covers during the typical lifetime of a cell phone.

SUMMARY

One embodiment of the present disclosure is directed to a cover for a user equipment.

The cover includes a housing, a display device, and a near field communication (NFC) circuit. The housing is attachable to the user equipment, and while attached covers a major surface of the user equipment. The display device is at least partially disposed within the housing. The NFC circuit is configured to generate power through inductive coupling to another NFC circuit within the user equipment, and operates from the power to receive data from the other NFC circuit within the user equipment, and supplies the power and the data to the display device to cause the data to be displayed for viewing by a user.

In some further embodiments, the display device may be configured to continue displaying the data after the NFC circuit ceases supplying power to the display device. The display device may be an E-Ink display.

The display device may respond to completing operations to cause display of data by transmitting an acknowledgment through the NFC circuit to the other NFC circuit of the user equipment to indicate that the user equipment can turn off the other NFC circuit of the user equipment to cease powering the NFC circuit through the inductive coupling.

The display device may be configured to respond to the data received from the NFC circuit by displaying text information that matches at least a portion of text information being displayed on a separate display device that is at least partially disposed within a front surface of the user equipment.

The NFC circuit may include a charging circuit and a rechargeable power supply.

The charging circuit charges the rechargeable power supply to at least an upper threshold level of stored power, in response to power received through the inductive coupling to the other NFC circuit within the user equipment, and then at least partially discharges the rechargeable power supply to provide power to the display device of the cover to temporarily power the display device to display the data. The charging circuit may be configured to charge the rechargeable power supply using magnetic fields received from the other NFC circuit of the user equipment.

The charging circuit may be configured to initiate the discharging of the rechargeable power supply to temporarily power the display device of the cover in response to the NFC circuit of the cover receiving the data from the NFC circuit of the user equipment and the rechargeable power supply reaching at least the upper threshold level of stored power.

The display device may respond to the rechargeable power supply becoming discharged to at least a lower threshold level of stored power by transmitting an acknowledgment through the NFC circuit to the other NFC circuit of the user equipment that indicates that the user equipment can turn off the other NFC circuit of the user equipment to cease powering the NFC circuit of the cover.

The charging circuit may be configured to further respond to the rechargeable power supply being charged to at least the upper threshold level by transmitting a ready signal through the NFC circuit to the other NFC circuit of the user equipment to indicate that the display device is operating and is ready to receive the data from the other NFC circuit for display on the display device.

The rechargeable power supply may be connected to power a user input interface and to sense activation of the user input interface. The rechargeable power supply can then respond to a user activating the user input interface by turning on the NFC circuit to transmit user data from the user input interface to the other NFC circuit of the user equipment.

The user input interface may include a touch sensitive interface on the display device to receive the user data responsive to a user touch selection on the touch sensitive display.

The display device may be configured to transmit information, which identifies a display characteristic of the display device, through the NFC circuit to the other NFC circuit to cause formatting of data by the user equipment for compatible display operations on the display device.

The NFC circuit may be configured to transmit a universal resource locator address to the other NFC circuit that indicates where the user equipment can obtain data for transmission to the NFC circuit of the cover for display on the display device.

Another embodiment of the present invention is directed to a user equipment that includes a housing, a display device, a NFC circuit, and a processor. The housing attaches to a cover that covers a major surface of the user equipment. The display device is at least partially disposed within a front surface of the housing. The NFC circuit is configured to provide power through inductive coupling to another NFC circuit of the cover to power the other NFC circuit and another display device that is at least partially disposed in the cover. The processor is configured to transmit data through the NFC circuit to the other NFC circuit of the cover for display on the other display device of the cover.

In some further embodiments, the processor may be further configured to respond to an acknowledgment received by the NFC circuit from the other NFC circuit of the cover indicating that the data has been displayed on the other display device of the cover, by turning off the NFC circuit to cease powering the other NFC circuit of the cover.

The processor may be further configured to respond to the data being ready for transfer to the other NFC circuit of the cover by turning on the NFC circuit to power the other NFC circuit and to transmit the data to the other NFC circuit for display on the other display device of the cover.

The processor may be further configured to delay transmission of the data through the NFC circuit to the other NFC circuit of the cover until expiration of a defined time after turning on the NEC circuit that is sufficient for the other NFC circuit of the cover to have stored at least a threshold level of power sufficient to power the other display device of the cover to allow display of the data.

The processor may be further configured to delay transmission of the data through the NFC circuit to the other NFC circuit of the cover until a ready signal is received from the other NFC circuit of the cover indicating that the other NFC circuit has stored at least a threshold level of power sufficient to power the other display device of the cover to enable display of the data.

The processor may be further configured to receive information through the NFC circuit from the other NFC circuit of the cover that identifies a display characteristic of the other display device of the cover, and to format the data transmitted through the NFC circuit to the other NFC circuit of the cover for compatible display operation on the other display device of the cover.

The processor may be further configured to receive information through the NFC circuit from the other NFC circuit of the cover that identifies a display characteristic of the other display device of the cover, and to regulate a length of time that the NFC circuit remains on, when data is ready to be transmitted to the other NFC circuit of the cover, based on the display characteristic of the other display device of the cover.

The user equipment may further include a radio access transceiver that is configured to communicate with a network node of a wireless communication system. The processor may be further configured to respond to the radio access transceiver receiving a phone call containing a call identifier and/or receiving a text message containing text by turning on the NFC circuit and transmitting the call identifier of the phone call and/or the text content of the text message through the NFC circuit to the other NFC circuit of the cover for display on the other display device of the cover.

Other user equipment, covers, methods, and/or computer program products according to other embodiments will be or become apparent to one with skill in the art upon review of the following drawings and detailed description. It is intended that all such additional user equipment, covers, methods, and/or computer program products be included within this description, be within the scope of the present invention, and be protected by the accompanying claims.

BRIEF DESCRIPTION OF DRAWINGS

Aspects of the present disclosure are illustrated by way of example and are not limited by the accompanying drawings. In the drawings.

DESCRIPTION OF EMBODIMENTS

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

At least some embodiments of the present disclosure enable users to more easily and dynamically customize the external appearance of their phone or other user equipment. Some embodiments are directed to a cover that is attachable to a phone. The cover includes a near field communication (NFC) circuit that powers a low power display device that is at least partially disposed in the cover. The NFC circuit of the cover is, in turn, powered by inductive coupling to a separate NFC circuit within the phone. The phone transmits data through its NFC circuit for receipt by the NFC circuit of the cover and display on the display device of the cover.

Because the NFC circuit of the cover has a limited ability to supply power to the display device of the cover (i.e., due to the inductive-based power generation), the display device of the cover is a low-power display which can be an E-Ink display or other display technology that is configured to continue displaying what it is presently displaying after power is no longer supplied to the display device. Thus, the display device can continue to display its previous image/text after the NFC circuit of the phone ceases powering the NFC circuit of the cover and, thereby, ceases powering the display device. A user can operate the phone to display graphical images, books, or other displayable indicia on the display device of the cover. The external appearance of phone is thereby easily and dynamically customizable by changing what is displayed on the display device of the cover.

For example, whenever a user sets a theme or wallpaper for display on a display device of the phone, the phone may communicate corresponding data to the cover for display on the display device. The display device of the cover may thereby be changed to mirror or otherwise change based on changes made to the display device of the phone. The phone can turn on the NFC circuit when wanting to communicate data to the cover, and can then turn off the NFC circuit to conserve power. Because the display device of the cover retains its displayed information (e.g., text, image, graphics, etc.) after removal of power, the NFC circuit of the cover may be powered only when changes to the display device are desired.

The display device on the cover can be used as an electronic reader (e-reader) with the phone operating to push pages of text to the cover for display on the display device. A user may operate a user input interface on the phone (e.g., by swiping a touch sensitive display device of the phone, pressing a button, etc.) and/or on the cover (e.g., by swiping a touch sensitive interface of the display device of the cover, pressing a button, etc.) to notify the phone when a next page, previous page, or other change to the displayed text is desired.

Figure 1:
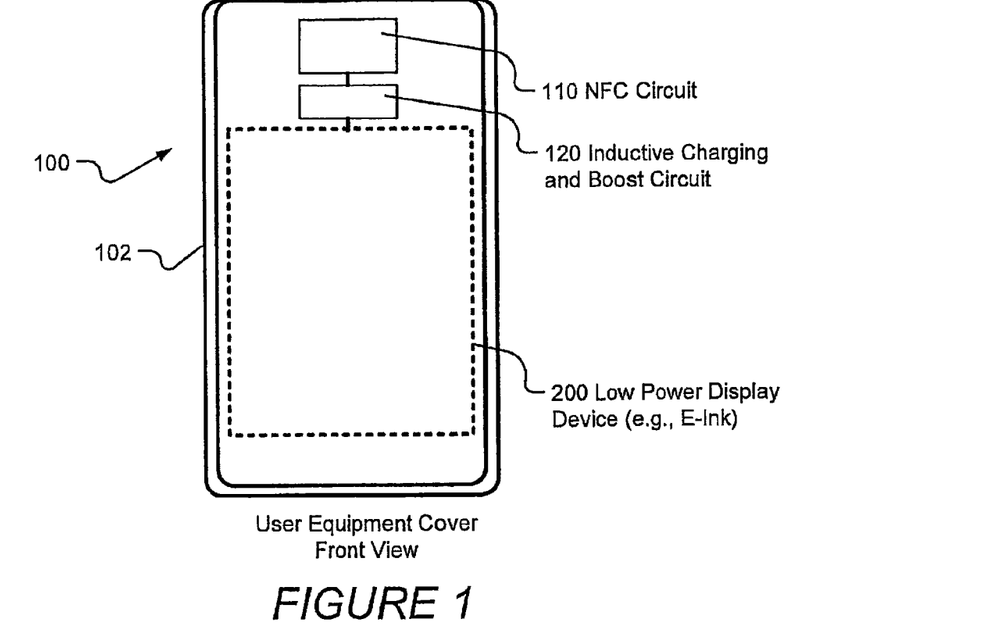
FIG. 1 illustrates a front view of a cover for a user equipment that is configured according to some embodiments.
Figure 2:
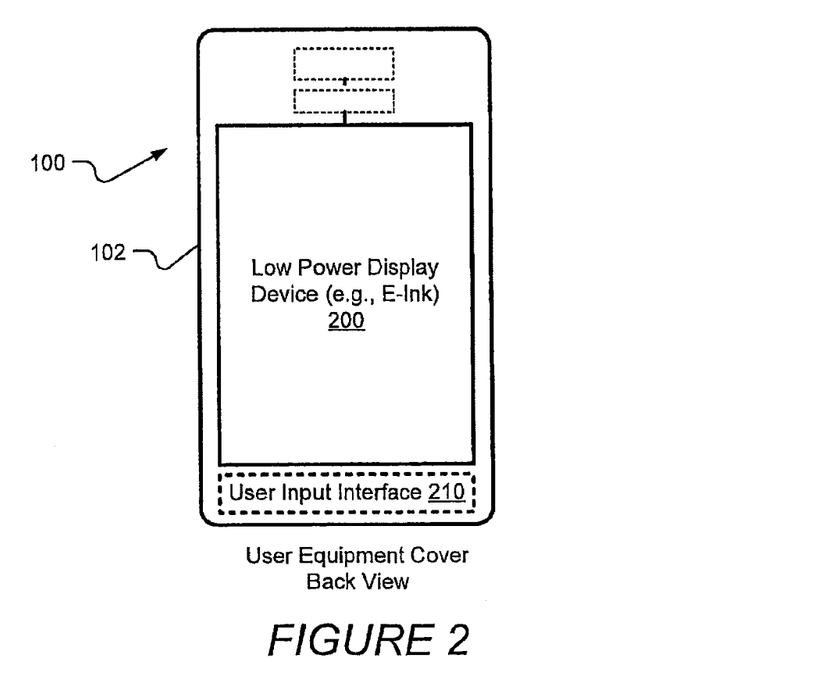
FIG. 2 illustrates a back view of the cover of FIG. 1 and shows a display device configured according to some embodiments.

A nonlimiting example embodiment of a cover 100 that can be used with a phone or other user equipment is shown in FIGS. 1 and 2. FIG. 1 is a front view of the cover 100 that is attachable to a housing of a user equipment (e.g., 300 in FIG. 3), and FIG. 2 is a back view of the cover 100 that faces away from the user equipment 300 while the cover 100 is attached thereto. The user equipment 300 can be any electronic device having a NFC circuit 310 (FIG. 3) configured to provide sufficient power to communicate with and provide power sufficient operate another NFC circuit and a display device according to one or more embodiments disclosed herein. The user equipment 300 can include, but is not limited to, a cellular phone, a tablet computer, a palmtop computer, a mobile music/video player, etc. The cover 100 may attach to the user equipment 300 in any manner, such as by snapping on and/or sliding on to connect to a back, front, side, and/or other major surface of the user equipment 300, through a frame that is connected along/around a major surface of the user equipment 300, etc.

Referring to FIGS. 1 and 2, the cover 100 includes a housing 102, a display device 200, and a NFC circuit 110. The cover 100 is attachable to a user equipment 300 (FIG. 3), and while attached covers a back surface of the user equipment 300. The display device 200 is at least partially disposed within the housing 102, facing away from a back surface of the cover and away from the user equipment 300 while the cover 100 is attached to the equipment 300. The NFC circuit 110 generates power through inductive coupling to another NFC circuit 310 (FIG. 3) within the user equipment 300. The NFC circuit 110 operates using the power to receive data from the other NFC circuit 310 within the user equipment 300, and to supply the power and the data to the display device 200 to cause the data to be displayed for viewing by a user.

Figure 3:
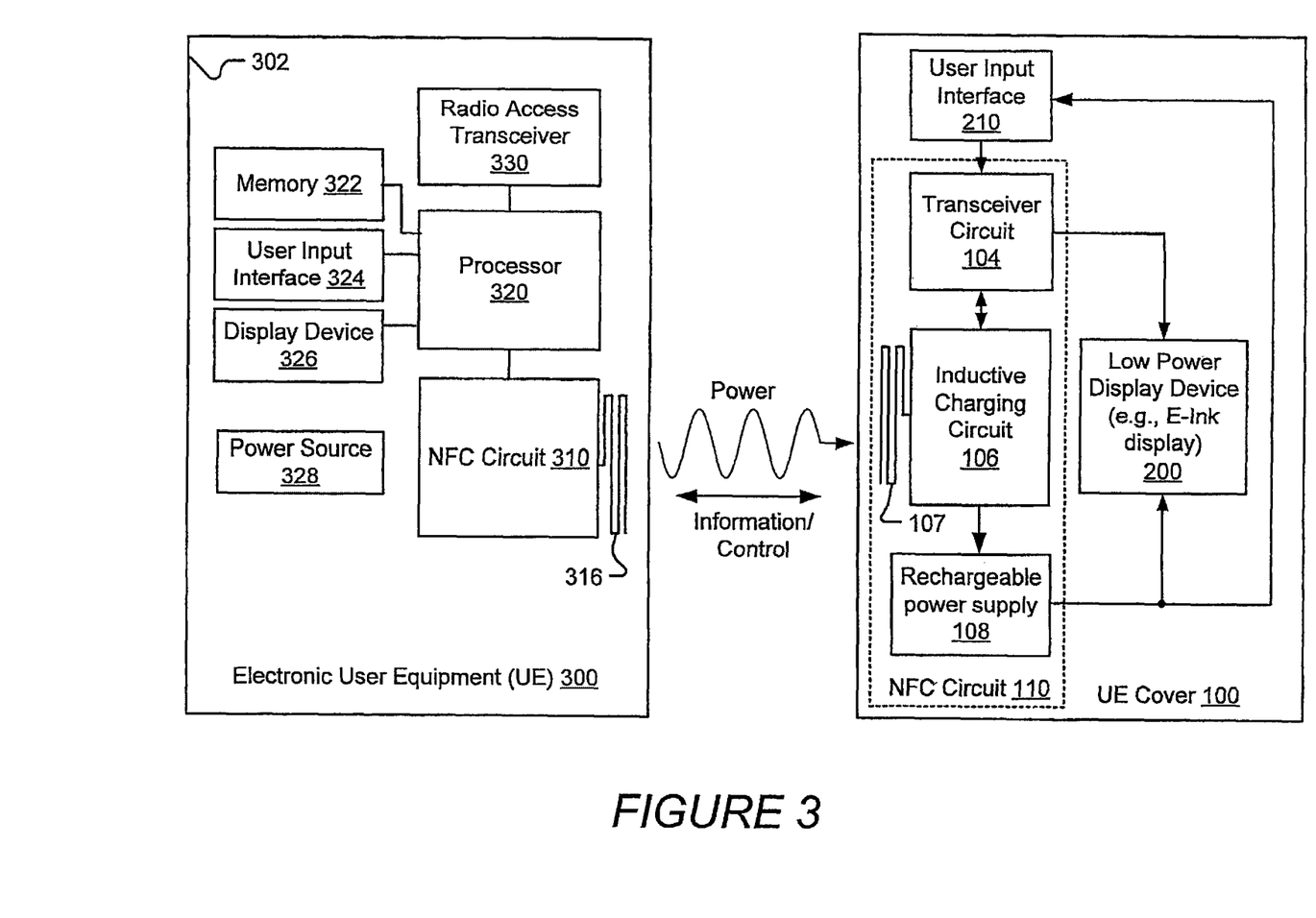
FIG. 3 is a block diagram of a cover connectable to a user equipment, which are configured according to some embodiments.

Although various embodiments are disclosed herein in the context of the cover 100 attaching to a back surface of the user equipment 300, the present disclosure is not limited thereto because the cover may additionally or alternatively attached to any major surface such as a side or front surface of the user equipment 300. For example, the cover 100 may be connected to the user equipment 300 through a rotatable hinge that allows the cover to be closed to cover a front surface and the display device 326 of the user equipment 300, while text, an image, graphics, etc. are displayed on the display device 200 (which now faces away from a front surface of the user equipment 300) to allow viewing by a user. While in the close configuration, the user equipment 300 may turn off its display device 326 to conserve power and may furthermore enter a power off or sleep mode. The display device 200 may thereby provide a static display of information to a user without further operation by the user equipment 300. The user equipment 300 may transition from a sleep mode to a higher power mode responsive to an incoming call, message, etc. and communicate related data to the display device 200 before returning to the sleep mode. The display device 200 can thereby indicate status information to a user while the user equipment 300 is sleeping or turned off.

The display device 200 is a low power device that can be powered by the NFC circuit 110 and may be an E-Ink display or other display technology that is configured to continue displaying what it is presently displaying after the NFC circuit of the phone ceases powering the NFC circuit 110 and the display device 200. The cover 100 may include an inductive charging circuit that charges a rechargeable power supply that stores power until a sufficient level is reached for discharge to power the display device 200 to operate to display data that is received through the NFC circuit 110 from the user equipment 300.

The cover 100 may also include a user input interface 210 that can be operated by a user to activate the NFC circuit 310 (FIG. 3) within the user equipment 300 and/or to send user data through the NFC circuit 110 to control operation of the user equipment 300.

FIG. 3 is a block diagram of a cover 100 and a user equipment 300 that are connectable and configured to operate according to some embodiments. The user equipment 300 can include a housing 302, a processor circuit 320, a radio access transceiver 330, a NFC circuit 310, a memory device(s) 322, a display device 326, a user input interface 324 (e.g., touch sensitive interface for the display device 326, keypad/keyboard, button(s)/switch(es), etc.), and a power source 328 (e.g., rechargeable battery) that supplies power to these and other components. The display device 326 may be a conventional device found in a cell phone, tablet computer, palmtop computer, portable music/video player, or other user equipment, and may be at least partially disposed within a front surface of the housing 302. The radio access transceiver 330 may include, but is not limited to, a LTE or other cellular transceiver, Bluetooth transceiver, WiFi transceiver, WiMax transceiver, or other communication transceiver is configured to communicate with a network node of a telecommunications system. The processor 320 may include one or more data processing circuits, such as a general purpose and/or special purpose processor (e.g., microprocessor and/or digital signal processor). The processor 320 is configured to execute computer program instructions from functional modules in the memory 322, described below as a computer readable medium, to perform at least some of the operations and methods described herein as being performed by a user equipment.

The cover 100 can include a NFC circuit 110 and a low-power display device 200, and may optionally further include a user input interface 210 and a rechargeable power supply 108. The user input interface 210 may be a touch sensitive interface for the display device 200, a keypad/keyboard, button(s)/switch(es), etc.). The display device 200 is a low-power display which can be an electrophoretic or electronic (e.g., E-Ink) display or other display technology that can operate at sufficiently low power levels to be operable using power supplied by the NFC circuit 110, and configured to continue displaying what it was displaying immediately before power ceases to be supplied to the display device 200.

The NFC circuit 110 of the cover 100 and the NFC circuit 310 of the user equipment 300 use short-range high frequency wireless communication technology which enables the exchange of data between devices over about a 10 cm distance, although the NFC circuits 110 and 310 are not limited to operating in at any defined range. The communication protocol and operation can be an extension of the ISO 14443 proximity-card standard (contactless card, RFID) and can be specified in the ECMA-340 and ISO/IEC 18092 technology standards. Some embodiments of the NFC circuits 100 and 310 may communicate using existing ISO 14443 smartcards and readers and can thereby be compatible with existing contactless communication infrastructure.

The NFC circuits 100 and 310 may communicate via magnetic field induction. A loop antenna 316 connected to the NFC circuit 310 and a loop antenna 107 of the NFC circuit 110 are placed in close proximity to each other within the other's antenna near field, thereby effectively forming an air-core transformer. Some embodiments of the NFC circuits 110 and 310 can transmit within the globally available and unlicensed radio frequency ISM band of 13.56 MHz, with a bandwidth of almost 2 MHz. Some embodiments of the NFC circuits 110 and 310 can support data rates of 106, 212, or 424 kbit/s using a modified Miller coding or Manchester coding to encode and decode communicated data.

The NFC circuit 110 of the cover 100 can be configured to operate in a passive communication mode, because the cover 100 does not have its own power source. In contrast, the NFC circuit 310 of the user equipment 300 can be configured to operate in an active communication mode because of the power source 328 (FIG. 3), e.g., rechargeable battery, of the user equipment 300. When operating in the passive communication mode, the NFC circuit 310 of the user equipment 300 provides a carrier field and the NFC circuit 110 of the cover 100 answers by modulating the carrier field. In this mode, the NFC circuit 110 of the cover 100 generates its operating power from the NFC circuit 310 provided electromagnetic field, thus making the NFC circuit 110 of the cover 100 a transponder. In some other embodiments the NFC circuit 110 of the cover 100 contains a power supply and is configured to operate in an active communication mode.

A user can operate the user equipment 300 (via the user input interface 324, the processor 320, and the NFC circuit 310) to transmit images, graphical indicia, textual information, etc. to the cover 100 for display on the display device 200. The external appearance of the user equipment 300 is thereby easily and dynamically customizable by changing what is displayed on the display device 200 of the cover 100.

For example, whenever a user sets a theme or wallpaper for display on the display device 326 of the user equipment 300, the processor 320 may communicate corresponding data to the NFC circuit 110 of the cover 100 for display on the display device 200. The display device 200 of the cover 100 may thereby be changed to mirror or otherwise change based on changes made to the other display device 326 of the user equipment 300. For example, the processor 320 can transmit data to the cover 100 to cause the display device 200 to display text information that matches at least a portion of text information being displayed on the display device 326 of the user equipment 300.

A user may alternatively operate the processor 320 to transmit any text, image, or other indicia to the cover 100 for display on the display device 200, irrespective of what has been or will be displayed on the display device 326 of the user equipment 300. The processor 320 can turn on the NFC circuit 310 when wanting to communicate data to the cover 100, and can then turn off the NFC circuit 310 to conserve power. Because the display device 200 of the cover retains its displayed look after removal of power, the NFC circuit 110 of the cover 100 may be temporarily powered only when changes to the display device 200 are desired.

The display device 200 on the cover 100 can be used as an electronic reader (e-reader) with the processor 320 pages of text to the cover 100 for display on the display device 200. A user may operate the user input interface 324 on the user equipment 300 (e.g., by swiping a touch sensitive interface, pressing a button, etc.) and/or operate the user input interface 210 on the cover 100 (e.g., by swiping a touch sensitive interface of the display device 200, pressing a button, etc.) to notify the user equipment 300 when a next page, previous page, or other change is desired for the display device 200.

Further Example Operations and Methods

FIGS. 4-7 are flowcharts of operations and methods that may be performed by the user equipment 300, in accordance with some embodiments.

Figure 4:
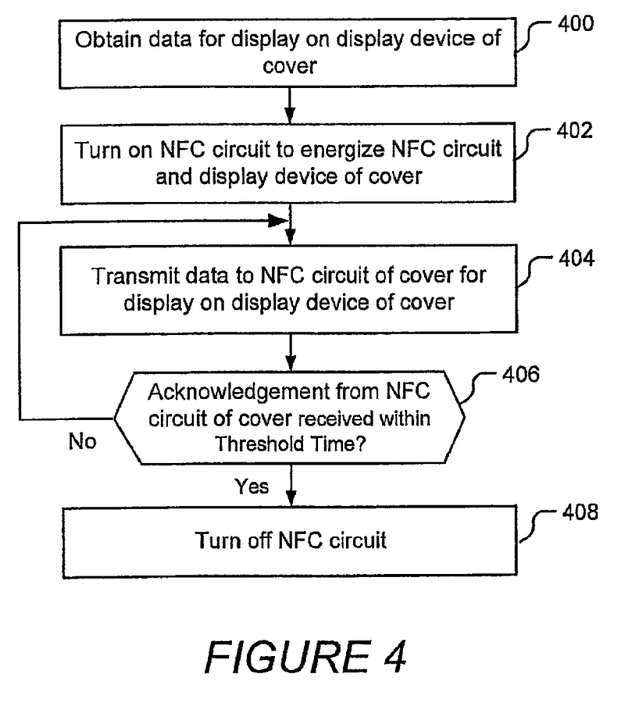
FIG. 4 is a flowchart of operations and methods that may be performed by a user equipment in accordance with some embodiments.

Referring to FIG. 4, the processor 320 obtains (block 400) data for display on the display device 200 of the cover 100. The processor 320 may obtain the data from various applications being executed by the processor 320, from one or more network nodes communicating therewith through the radio access transceiver 330, and/or based on information received from the cover 100. For example, the NFC circuit 110 of the cover 100 may transmit a universal resource locator (URL) address to the other NFC circuit 310 that indicates where the user equipment 300 can obtain data for transmission to the NFC circuit 110 of the cover 100 for display on the display device 200. Such URL address may, for example, direct the user equipment 300 to a website address that supplies background wallpaper images that are downloadable from a network node to the user equipment 300 for display on the display device 200 of the cover 100. The URL address may be initially provided from the cover 100 to the user equipment 300 in response to a first communication between the NFC circuits 110 and 310, such as when the cover 100 is first attached to the user equipment 300.

The processor 320 turns on (block 402), such as by supplying power to, the NFC circuit 310 to energize (power) the NFC circuit 110 and the display device 200 of the cover 100. The processor 320 transmits (block 404) the data through the NFC circuit 310 to the NFC circuit 110 of the cover 100 for display on the display device 200.

The processor 320 may optionally be further configured to determine (block 406) and respond to an acknowledgment received by the NFC circuit 310 within a threshold time from the other NFC circuit 110 of the cover 100, which acknowledgment indicates that the data has been received by the NFC circuit 110 and/or displayed on the other display device 200 of the cover 100, by turning off (block 408) the NFC circuit 310 to cease powering the other NFC circuit 110 of the cover 100. The processor 320 may repeat the transmission (block 404) of the data to the NFC circuit 110 of the cover 100 if the acknowledgment is not determined (block 406) to have been received within the threshold time. Temporarily turning the NFC circuit 310 on when data is to be transmitted to the UE cover 100 to change what is displayed on the display device 200 and then turning the NFC circuit 310 off, conserves how much power is drawn from the power source 328.

Accordingly, with reference to FIG. 3, the display device 200 can be configured to respond to completing display of data on the display device 200 (e.g., determined by expiration of a defined time after receipt of the data) by transmitting an acknowledgment through the NFC circuit 110 to the other NFC circuit 310 of the user equipment 300 to indicate that the user equipment 300 can turn off the other NFC circuit 310 to cease powering the NFC circuit 110 through the inductive coupling.

Figure 5:
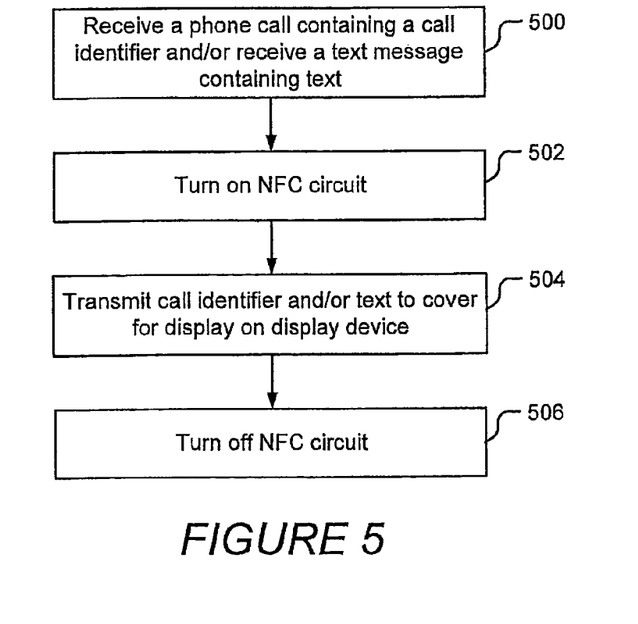
FIG. 5 is a flowchart of operations and methods that may be performed by a user equipment in accordance with some embodiments.

Referring to FIG. 5, the processor 320 receives (block 500), through the radio access transceiver 330 from a network node, a phone call containing a call identifier (e.g., caller ID of the calling party) and/or receives a text message containing text. The processor 320 turns on (block 502) the NFC circuit 310 to energize (power) the NFC circuit 110 and the display device 200 of the cover 100. The processor 320 transmits (block 504) the call identifier and/or text through the NFC circuit 310 to the NFC circuit 110 of the cover 100 for display on the display device 200. Processor 320 then turns off (block 506) the NFC circuit 310, and may optionally wait for an acknowledgment from the cover 100 as described above in FIG. 4 before turning off the NFC circuit 310.

Figure 6:
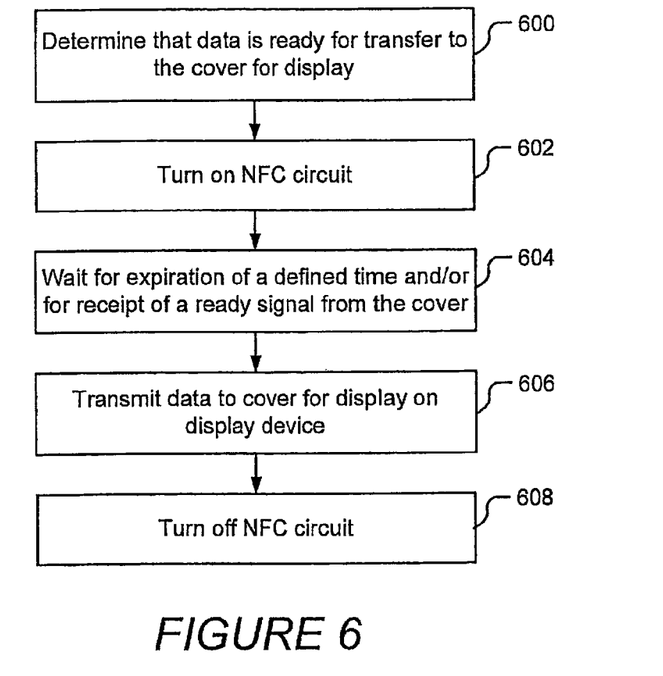
FIG. 6 is a flowchart of operations and methods that may be performed by a user equipment in accordance with some embodiments.

Referring to FIG. 6, the processor 320 determines (block 600) that data is ready (e.g., data resides in an output queue in the memory 322) for transfer to the cover 100 for display on the display device 200. The processor 320 turns on (block 602) the NFC circuit 310 to energize (power) the NFC circuit 110 and the display device 200 of the cover 100. The processor 320 optionally waits for expiration of a defined time and/or for receipt of a ready signal from the cover 100. The defined time can be defined as a time after turning on the NFC circuit 310 that is sufficient for the other NFC circuit 110 of the cover 100 to have stored at least a threshold level of power sufficient to power the display device 200 of the cover 100 to allow display of the data. Alternatively the ready signal can be used as an indicating that the NFC circuit 110 of the cover 100 is ready to receive and buffer the data for transfer to the display device 200, or that the NFC circuit 110 has stored at least a threshold level of power sufficient to power the display device 200 to allow display of data. The processor 320 then transmits (block 606) the data through the NFC circuit 310 to the NFC circuit 110 of the cover 100 for display on the display device 200. The processor 320 then turns off (block 608) the NFC circuit 310, and may optionally wait for an acknowledgment from the cover 100 as described above in FIG. 4 before turning off the NFC circuit 310.

Figure 7:
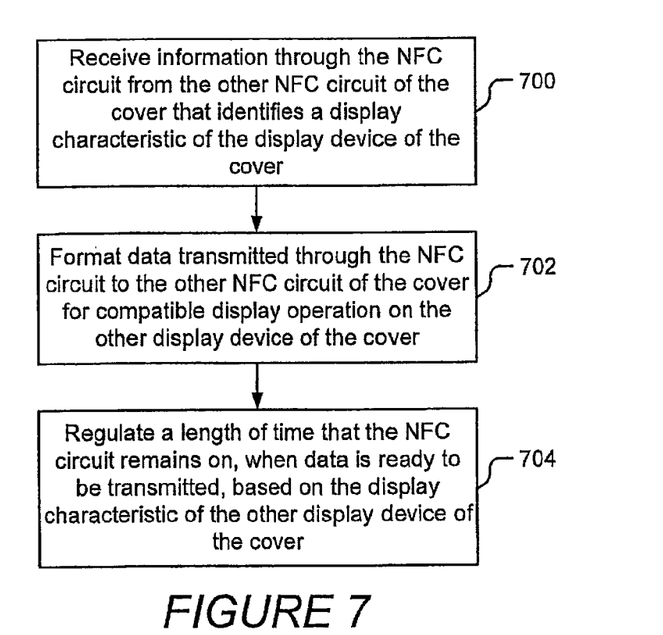
FIG. 7 is a flowchart of operations and methods that may be performed by a user equipment in accordance with some embodiments.

Referring to FIG. 7, the processor 320 receives (block 700) information through the NFC circuit 310 from the other NFC circuit 110 of the cover 100 that identifies a display characteristic of the other display device 200. The processor 320 formats (block 702) data transmitted through the NFC circuit 310 to the other NFC circuit 110 of the cover 100 for compatible display operations by the other display device 200 of the cover 100. The display device 200 may thereby indicate through the transmitted information one or more display formats it operationally supports, and the processor 320 can use the information to provide properly formatted data (e.g., ASCII text, bitmapped graphics, etc.) that is compatible for display on the display device 200.

In a corresponding manner, the display device 200 may be configured to transmit information, which identifies a display characteristic of the display device 200, through the NFC circuit 110 to the other NFC circuit 310 to cause the formatting of data by the processor 320 for compatibility display operation on the display device 200.

With continued reference to FIG. 7, in addition to the formatting operations of block 702 or as an alternative to the operations of block 702, the processor 320 can optionally regulate (block 704) a length of time that the NFC circuit 310 remains on, when data is ready to be transmitted to the other NFC circuit 110 of the cover 100, based on the display characteristic of the other display device 200. The display device 200 may thereby indicate through the transmitted information a model number, power consumption for operation, or indication of long it is expected to take for the NFC circuit 110 to store at least a threshold level of power sufficient to power the display device 200 to allow display of data, and the processor 320 can use the information to regulate how long the NFC circuit 310 remains on before the data is transmitted and/or after the data is transmitted before the NFC circuit 310 is turned off.

With further reference to FIG. 3, in some further embodiments, the NFC circuit of the cover 100 includes a transceiver circuit 102 that communicates with a transceiver circuit 104 of the NFC circuit 310 of the user equipment 300 through inductive coupling via magnetic fields to the other NFC circuit 310, an inductive charging circuit 106 that generates power through inductive coupling via magnetic fields to the other NFC circuit 310, and a rechargeable power supply 108. The charging circuit 106 charges the rechargeable power supply 108 in response to power received through the inductive coupling to the NFC circuit 310 within the user equipment 300. In response to the rechargeable power supply 108 being charged to at least an upper threshold level of stored power, the charging circuit 106 then at least partially discharges the rechargeable power supply 108 to provide power to the display device 200 of the cover 100 to temporarily power the display device 200 to display data received from the user equipment 300. The data that is displayed may be temporarily buffered by the NFC circuit 110. Although the NFC circuit 310 may supply insufficient power at any given instant to power both the NFC circuit 110 and the display device 200 of the cover 100, the inductive charging circuit 106 can overcome this potential limitation by using the rechargeable power supply 108 to build-up its stored power over time and, thereby, boost the amount of power that is available to temporarily power operation of the display device 200.

In one embodiment, the inductive charging circuit 106 initiates the discharging of the rechargeable power supply 108 to temporarily power the display device 200 of the cover 100 in response to the NFC circuit 110 of the cover 100 receiving the data from the NFC circuit 110 of the user equipment 300 and the rechargeable power supply 108 reaching at least the upper threshold level of stored power. Thus, the amount of power stored in the rechargeable power supply 108 can continue to increase until the upper threshold level is reached and data is presently available for display on the display device 200.

In another embodiment, the display device 200 responds to the rechargeable power supply 108 becoming discharged to at least a lower threshold level of stored power by transmitting an acknowledgment through the NFC circuit 110 to the other NFC circuit 310 of the user equipment 300 that indicates that the user equipment 300 can turn off the other NFC circuit 310 of the user equipment 300 to cease powering the NFC circuit 110 of the cover 100.

The charging circuit 106 may be configured to further respond to the rechargeable power supply 108 being charged to at least the upper threshold level by transmitting a ready signal through the NFC circuit 110 to the other NFC circuit 310 of the user equipment 300 to indicate that the display device 200 is being powered and is ready to receive the data from the other NFC circuit 310 for display on the display device 200.

As explained above, the rechargeable power supply 108 may be connected to power the user input interface 210. The rechargeable power supply 108 may further sense activation of the user input interface 210 (e.g., user selection of a button, etc.), and respond thereto by turning on the NFC circuit 110 to transmit user data from the user input interface 210 to the other NFC circuit 310 of the user equipment 300. The user input interface 210 may be a touch sensitive display overlying the display device 200 to receive the user data responsive to a user touch selection on the touch sensitive display.

Thus, various embodiments of the present disclosure enable users to more easily and dynamically customize the external appearance of their phone or other user equipment. Moreover, new functionality is provided that enables information to remain displayed on the display device of the cover while the associated phone or other user equipment is in a sleep mode or turned off.

Further Definitions and Embodiments:

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or"includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A cover for a user equipment, the cover comprising:
  a housing that is attachable to the user equipment, and while attached covers a back surface of the user equipment;
  a display device at least partially disposed within the housing; and
  a near field communication (NFC) circuit that is configured to generate power through inductive coupling to another NFC circuit within the user equipment, the NFC circuit configured to operate using the power to receive data from the other NFC circuit within the user equipment, and to supply the power and the data to the display device to cause the data to be displayed for viewing by a user, wherein the NFC circuit comprises a charging circuit and a rechargeable power supply, the charging circuit charging the rechargeable power supply to at least an upper threshold level of stored power, in response to power received through the inductive coupling to the other NFC circuit within the user equipment, and then at least partially discharging the rechargeable power supply to provide power to the display device of the cover to temporarily power the display device to display the data, and wherein the charging circuit is configured to initiate the discharging of the rechargeable power supply to temporarily power the display device of the cover in response to the NFC circuit of the cover receiving the data from the NFC circuit of the user equipment and the rechargeable power supply reaching at least the upper threshold level of stored power.

2. The cover of claim 1, wherein the display device of the cover is configured to continue displaying the data after the NFC circuit ceases supplying power to the display device.

3. The cover of claim 2, wherein the display device of the cover comprises an E-Ink display.

4. The cover of claim 1, wherein the display device responds to completing display of data on the display device by transmitting an acknowledgment through the NFC circuit to the other NFC circuit of the user equipment to indicate that the user equipment can turn off the other NFC circuit of the user equipment to cease powering the NFC circuit through the inductive coupling.

5. The cover of claim 1, wherein the display device of the cover is configured to respond to the data received from the NFC circuit by displaying text information that matches at least a portion of text information being displayed on a separate display device at least partially disposed within a front surface of the user equipment.

6. The cover of claim 1, wherein the charging circuit is configured to charge the rechargeable power supply using magnetic fields received from the other NFC circuit of the user equipment.

7. The cover of claim 1, wherein the display device responds to the rechargeable power supply becoming discharged to at least a lower threshold level of stored power by transmitting an acknowledgment through the NFC circuit to the other NFC circuit of the user equipment that indicates that the user equipment can turn off the other NFC circuit of the user equipment to cease powering the NFC circuit of the cover.

8. The cover of claim 1, wherein the rechargeable power supply is connected to power a user input interface and to sense activation of the user input interface, and the rechargeable power supply responds to a user activating the user input interface by turning on the NFC circuit to transmit user data from the user input interface to the other NFC circuit of the user equipment.

9. The cover of claim 8, wherein the user input interface comprises a touch sensitive interface on the display device to receive the user data responsive to a user touch selection on the touch sensitive display.

10. The cover of claim 1, wherein the display device is configured to transmit information, through the NFC circuit to the other NFC circuit in the user equipment that indicates to the user equipment how long it takes for the NFC circuit to store sufficient power to power the display device to allow display of data.

11. The cover of claim 1, wherein the NFC circuit is configured to transmit a universal resource locator address to the other NFC circuit that indicates where the user equipment can obtain data for transmission to the NFC circuit of the cover for display on the display device.

12. A cover for a user equipment, the cover comprising:
a housing that is attachable to the user equipment, and while attached covers a back surface of the user equipment;
a display device at least partially disposed within the housing: and
a near field communication (NFC) circuit that is configured to generate power through inductive coupling to another NFC circuit within the user equipment, the NFC circuit configured to operate using the power to receive data from the other NFC circuit within the user equipment, and to supply the power and the data to the display device to cause the data to be displayed for viewing by a user,
wherein the NFC circuit comprises a charging circuit and a rechargeable power supply, the charging circuit charging the rechargeable power supply to at least an upper threshold level of stored power, in response to power received through the inductive coupling to the other NFC circuit within the user equipment, and then at least partially discharging the rechargeable power supply to provide power to the display device of the cover to temporarily power the display device to display the data, and
the charging circuit is configured to further respond to the rechargeable power supply being charged to at least the upper threshold level by transmitting a ready signal through the NFC circuit to the other NFC circuit of the user equipment to indicate that the display device is operating and is ready to receive the data from the other NFC circuit for display on the display device.

13. A user equipment comprising:
a housing that attaches to a cover that covers a back surface of the user equipment;
a display device at least partially disposed within a front surface of the housing;
a near field communication (NFC) circuit that is configured to provide power through inductive coupling to another NFC circuit of the cover to power the other NFC circuit and another display device that is at least partially disposed in the cover; and
a processor configured to:
respond to the data being ready for transfer to the other NFC circuit of the cover by turning on the NFC circuit to power the other NFC circuit and transmitting the data through the NFC circuit to the other NFC circuit of the cover for display on the other display device of the cover; and
delay transmission of the data through the NFC circuit to the other NFC circuit of the cover until expiration of a defined time after turning on the NFC circuit that is sufficient for the other NFC circuit of the cover to have stored at least a threshold level of power sufficient to power the other display device of the cover to enable display of the data.

14. The user equipment of claim 13, wherein:
the processor is further configured to respond to an acknowledgment received by the NFC circuit from the other NFC circuit of the cover indicating that the data has been displayed on the other display device of the cover, by turning off the NFC circuit to cease powering the other NFC circuit of the cover.

15. The user equipment of claim 13, wherein:

the processor is further configured to delay transmission of the data through the NFC circuit to the other NFC circuit of the cover until a ready signal is received from the other NFC circuit of the cover indicating that the other NFC circuit has stored at least a threshold level of power sufficient to power the other display device of the cover to allow display of the data.

16. The user equipment of claim 13, wherein:

the processor is further configured to receive information through the NFC circuit from the other NFC circuit of the cover that identifies a display characteristic of the other display device of the cover, and to format the data transmitted through the NFC circuit to the other NFC circuit of the cover for compatible display operation on the other display device of the cover.

17. The user equipment of claim 16, wherein:

the processor is further configured to receive information through the NFC circuit from the other NFC circuit of the cover that indicates to the user equipment how long it takes for the other NFC circuit of the cover to store sufficient power to power the another display device to allow display of data, and to regulate a length of time that the NFC circuit remains on, when data is ready to be transmitted to the other NFC circuit of the cover, based on the information.

18. The user equipment of claim 13, further comprising:

a radio access transceiver configured to communicate with a network node of a wireless communication system, wherein the processor is further configured to respond to the radio access transceiver receiving a phone call containing a call identifier and/or receiving a text message containing text by turning on the NFC circuit and transmitting the call identifier of the phone call and/or the text content of the text message through the NFC circuit to the other NFC circuit of the cover for display on the other display device of the cover.

* * * * *